United States Patent [19]

Frankel et al.

[11] 4,379,894

[45] Apr. 12, 1983

[54] AQUEOUS PROCESS FOR THE QUANTITATIVE CONVERSION OF POLYEPICHLOROHYDRIN TO GLYCIDYL AZIDE POLYMER

[75] Inventors: Milton B. Frankel, Tarzana; Edward F. Witucki, Van Nuys; Dean O. Woolery, II, Reseda, all of Calif.

[73] Assignee: Rockwell International Corporation, El Segundo, Calif.

[21] Appl. No.: 330,405

[22] Filed: Dec. 14, 1981

[51] Int. Cl.³ ...................... C08G 65/24; C08G 65/32
[52] U.S. Cl. ..................................... 525/403; 528/421
[58] Field of Search ......................... 525/403; 528/421

[56] References Cited

U.S. PATENT DOCUMENTS 3,645,917  2/1972  Vardenberg .................... 525/403 X
4,268,450  5/1981  Frankel et al. ................. 525/403 X Primary Examiner—Earl A. Nielsen
Attorney, Agent, or Firm—H. Fredrick Hamann; Harry B. Field

[57] ABSTRACT

An aqueous process for the quantitative conversion of polyepichlorodrin (PECH) to glycidyl azide polymer (GAP), using a phase transfer catalyst, is disclosed.

21 Claims, No Drawings

AQUEOUS PROCESS FOR THE QUANTITATIVE CONVERSION OF POLYEPICHLOROHYDRIN TO GLYCIDYL AZIDE POLYMER

STATEMENT OF GOVERNMENT INTEREST

The Government has rights in this invention pursuant to Contract F04611-80-C-0005 awarded by the U.S. Department of Defense.

BACKGROUND OF THE INVENTION

1. Field of the Invention

This invention relates to a process for the production of a propellant additive, and is more particularly directed to an aqueous process for the production of glycidyl azide polymer (GAP) from polyepichlorohydrin (PECH).

2. Description of the Prior Art

The direct introduction of the azido group by nucleophilic displacement with azide ion constitutes the most convenient and general synthesis of aliphatic azides. A wide range of leaving groups has been employed in the reaction, e.g., sulfate, nitro, nitrate, phenylazo, and iodoxy, but p-toleunesulfonyl, methanesulfonyl, and halogeno derivatives are the most frequently used.

Prior to the use of dipolar aprotic solvents for these reactions, the general procedure involved interactions of the alkyl substrate with sodium azide in aqueous alcohol. Sealed tubes and a complicated work-up procedure including the separation of azeotropic mixtures were required, and in addition the facility of the reaction depended critically on the nature of the sodium azide employed. This situation existed until 1957 when Lieber, Chao, and Rao demonstrated the advantages to be gained from using high-boiling solvents such as the monalkyl ethers of diethylene glycol. (Lieber, E., T. S. Chao, and C. Rao, *J. Org. Chem.*, 22, 238 (1957). This modification, which obviated the use of sealed tubes and the prior activation of sodium azide, enabled higher yields to be achieved and work-up procedures were simplified since azeotropic mixtures were not formed. Dipolar aprotic solvents are even more efficacious and dimethylsulfoxide (Jones, D. N., *Chem. Ind. (London)*, 179 (1962) and dimethylformamide (Smolinsky, G., *J. Am. Chem. Soc.*, 83, 4483 (1961) are now used routinely as media for azide substitution reactions.

As previously noted, dipolar aprotic solvents such as dimethylformamide are efficient solvents for the synthesis of azido compounds. However, they are expensive and they cause problems in the synthesis of polymeric azides. The principal problem associated with the use of these solvents is the difficulty in their quantitative removal from the polymeric product. The polymer tends to hold on to the solvent and multiple water washings are required to remove the solvent. Furthermore, such systems tend to emulsify and make separation of the layers very difficult, causing loss of product. Consequently, very long work-up times are required to isolate the solvent-free polymer.

SUMMARY OF THE INVENTION

Accordingly, there is provided by the present invention an aqueous process for the quantitative conversion of PECH to GAP which comprises combining the reactants of polyepichlorohydrin and sodium azide in an aqueous medium of a phase transfer catalyst such as methyl tricapryl ammonium chloride. The reactants are to be maintained at a temperature ranging from about 25° C. to about 100° C., while agitating the reactants. The reactants are allowed to react in a nitrogen purge environment to produce the product and by-products. By-products are then separated from the product layer through water-alcohol extration to remove any inorganic salts and phase transfer catalyst. The washed product is then dissolved in a low-boiling, non-polar solvent, purified by passing the dissolved product through an adsorbent such as silica gel, alumina, or charcoal, and then concentrating the purified product by distilling off the low-boiling non-polar solvent.

OBJECTS OF THE INVENTION

Therefore, it is an object of the present invention to provide a solvent medium for the preparation of polymeric azides in which the polymer is completely insoluble.

Another object of the present invention is to provide a non-flammable, low-cost solvent to provide a safe, economical process for the preparation of polymeric azides.

A further object of the present invention is to provide a catalyst so that quantitative conversion of polymeric azides can be achieved.

Yet a further object of the present invention is to provide an aqueous process for the quantitative conversion of polyepichlorohydrin to glycidyl azide polymer using a phase transfer catalyst.

Other objects, advantages and novel features of the present invention will become apparent from the following detailed description of the invention.

DESCRIPTION OF THE PREFERRED EMBODIMENTS

In accordance with the present invention, there is provided an aqueous process for the conversion of polyepichlorohydrin (PECH) to glycidyl azide polymer (GAP), using a phase transfer catalyst.

Specifically, PECH and an ionic azide such as lithium azide, potassium azide, or the preferred sodium azide are combined in a mixture comprising water and a phase transfer catalyst that can be used for the quantitative conversion of PECH to GAP. Although the ionic azide can be used in molar proportions, its preferred range is from about 5 to about 15% molar excess and the more preferred range of the ionic azide is a molar excess ranging from about 10 to about 15%. The preferred phase transfer catalyst is methyl tricapryl ammonium chloride (Aliquot 336, manufactured by Henkel Corp.), other phase transfer catalysts include tertiary amines and quaternary ammonium compounds. Although the phase transfer catalyst can be used in quantities merely sufficient to cause the quantitative conversion of PECH to GAP, the preferred amount is from an excess of about 5 to about 25 weight percent of phase transfer catalyst as related to PECH, and a most preferred excess ranging from about 10 to about 20 weight percent.

In order to cause the above reaction to proceed in an efficient manner, reaction conditions dictate that the aqueous mixture should be continuously agitated while maintaining the system at a temperature between about 90° C. and 95° C., while in a nitrogen purge environment. It should be noted that although the reaction operates most efficiently at the above most preferred temperature range, it will also proceed at a preferred range of about 80° C. to about 100° C., and at an extended range which varies from about 25° C. to about 100° C.

At completion of the above reaction, "neat" product recovery is effected in a multi-step process. First, the product layer is separated from the aqueous by-product layer. The product layer is then water-washed so as to remove inorganic salts generated during the reaction. Then, to remove the phase transfer catalyst from the water-washed product, the product is alcohol-washed with an alcohol in which the phase transfer catalyst is essentially completely soluble and in which the product is essentially totally insoluble. Although the preferred alcohol for this step is isopropyl, others include but are not limited to methyl and ethyl alcohol. After the phase transfer catalyst has been eliminated from the product, the product is purified by first dissolving it in a low-boiling, non-polar solvent such as chloroform, carbontetrachloride, or the preferred methylene chloride. Although many other low-boiling, non-polar solvents will also perform the same function, item- such as toxicity and flammability should be considered. The dissolved product is then passed through adsorbents such as alumina, charcoal or the preferred silica gel to remove any reaction impurities which may be remaining in the product stream. Final neat product recovery is effected by concentrating the product by driving off the low-boiling, non-polar solvent. A non-destructive process such as vacuum distillation is appropriate in this case.

By way of example and not limitation, the following illustration is given: A mixture of 248 grams (2.68 moles) of polyepichlorohydrin, 211 grams (3.25) moles) of sodium azide, 51 grams of Aliquot 336, and one liter of water was heated with good stirring for 48 hours at 95° C. under a gaseous nitrogen purge. The upper aqueous layer was then decanted. The residual polymer was washed four times with hot water to remove the inorganic salts (sodium azide and sodium chloride) and then washed four times with isopropyl alcohol to remove the Aliquot 336. The polymer was dissolved in methylene chloride to make a 20% solution and purified by passing over a column of silica gel. The solution was then concentrated to give an 85% yield of glycidyl azide polymer (GAP). Nitrogen analysis of the GAP corresponded to the theoretical (42%), confirming that quantitative conversion of PECH to GAP was achieved.

Obviously many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An aqueous process for the quantitative conversion of polyepichlorohydrin (PECH) to glycidyl azide polymer (GAP), comprises the steps of:
   combining said PECH and an ionic azide in a mixture of water and a phase transfer catalyst capable of the quantitative conversion of PECH to GAP;
   reacting said PECH and said ionic azide in said aqueous mixture while agitating said mixture at a temperature between about 25° C. and about 100° C., and wherein said aqueous mixture is maintained under a nitrogen purged environment; and
   recovering said GAP from said aqueous mixture by separating the aqueous layer from the product layer;
   water-washing said product layer to remove any inorganic salts remaining in the product layer;
   alcohol-washing said water-washed product layer so as to remove said phase transfer catalyst;
   dissolving said alcohol-washed product layer in a low-boiling, non-polar solvent;
   purifying said dissolved product layer by passing it through adsorbents capable of removing impurities; and
   concentrating said purified product layer so as to remove said low-boiling non-polar solvent.

2. The process of claim 1 wherein there is about a 5 to about a 25 percent molar excess of said ionic azide.

3. The process of claim 2 wherein said molar excess range is from about 10 to about 15 percent.

4. The process of claim 1 wherein said ionic azide is selected from the group consisting of sodium azide, lithium azide, and potassium azide.

5. The process of claim 4 wherein said ionic azide is sodium azide.

6. The process of claim 1 wherein said phase transfer catalysts are selected from the group consisting of tertiary amines.

7. The process of claim 1 wherein said phase transfer catalyst is methyl tricapryl ammonium chloride.

8. The process of claim 1 wherein said phase transfer catalyst is selected from the group consisting of quaternary ammonium compounds.

9. The process of claim 1 wherein the excess of said phase transfer catalyst is from about 5 to about 25 weight percent as related to said polyepichlorohydrin.

10. The process of claim 8 wherein the excess of said phase transfer catalyst is from about 10 to about 20 weight percent.

11. The process of claim 1 wherein said temperature is maintained between about 80° C. and about 100° C.

12. The process of claim 11 wherein said temperature range is maintained between about 90° C. and about 95° C.

13. The process of claim 1 wherein said separating is accomplished by decanting.

14. The process of claim 1 wherein said water-washing is hot water-washing.

15. The process of claim 1 wherein said alcohol washing is effected with an alcohol selected from the group consisting of isopropyl alcohol, methyl alcohol, and ethyl alcohol.

16. The process of claim 15 wherein said alcohol is isopropyl alcohol.

17. The process of claim 1 wherein said low-boiling non-polar solvent is selected from the group consisting of chloroform, carbontetrachloride, and methylene chloride.

18. The process of claim 17 wherein said low-boiling non-polar solvent is methylene chloride.

19. The process of claim 1 wherein said adsorbents are selected from the group consisting of silica gel, alumina, and charcoal.

20. The process of claim 1 wherein said adsorbent is silica gel.

21. The process of claim 1 wherein said concentrating is effected by vacuum distillation.

* * * * *